United States Patent [19]

Ståhl

[11] 4,023,918

[45] May 17, 1977

[54] PUMP

[75] Inventor: Torvald Ståhl, Alvsjo, Sweden

[73] Assignee: ITT Industries, Inc., New York, N.Y.

[22] Filed: Jan. 12, 1976

[21] Appl. No.: 648,607

[30] Foreign Application Priority Data

Feb. 10, 1975 Sweden .................. 7501410

[52] U.S. Cl. ..................... 415/112; 415/170 A; 277/27

[51] Int. Cl.² .................. F04D 29/08; F04D 29/22

[58] Field of Search ... 415/104, 106, 107, 110–113, 415/170 A, 219 C; 277/27, 3, 133

[56] References Cited

UNITED STATES PATENTS

| 1,146,079 | 7/1915 | Krogh | 415/106 |
|---|---|---|---|
| 1,326,064 | 12/1919 | Keller | 277/27 |
| 1,555,023 | 9/1925 | Prokofieff | 415/110 |
| 2,162,486 | 6/1939 | Le Tourneau | 415/110 |
| 2,680,410 | 6/1954 | Kolb | 415/104 |
| 2,796,027 | 6/1957 | Brown | 415/112 |
| 2,811,109 | 10/1957 | Brill et al. | 415/112 |
| 2,977,142 | 3/1961 | Alford | 415/110 |
| 3,228,342 | 1/1966 | Page | 415/170 A |
| 3,494,291 | 2/1970 | Carter, Jr. | 415/110 |
| 3,512,788 | 5/1970 | Kilbane | 415/110 |

Primary Examiner—Henry F. Raduazo
Attorney, Agent, or Firm—John T. O'Halloran; Peter C. Van Der Sluys; Vincent B. Ingrassia

[57] ABSTRACT

This invention relates to a device for balancing radial forces in rotor dynamic machines, especially centrifugal pumps which are provided with a seal between the pump impeller and the surrounding pump housing. A stationary seal ring is provided with two or two groups of notches. These are arranged peripherally and one of the groups of notches is exposed to the interior of the pump housing and the second group of notches is exposed to the surroundings, generally atmospheric. A pressure differential then exists which brings about a radial force on the impeller in a direction opposite that caused by radial reaction forces from the surrounding pump housing.

5 Claims, 5 Drawing Figures

PUMP

BACKGROUND OF THE INVENTION

This invention relates to a device for decreasing radial forces caused by shaft bendings in rotor dynamic machines such as centrifugal pumps.

The rotating impeller in such a pump is exposed to radial forces, reaction forces from the surrounding pump housing. These forces, which are caused by the pressure of the medium flowing through the housing, are not always uniformly allocated along the periphery. Therefore, a resultant force occurs which influences the impeller and the pump shaft in a certain radial direction.

It is possible to form the pump housing so that by a certain volume flow and a certain head, the resultant of the radial forces will be practically zero. As a pump, however, has to work under varying conditions, radial forces will appear. It then appears that the resultant force has one direction when the pump is working with a maximum volume flow and a low head and another direction when the pump is working with a minimum volume flow and a high head. Of these two cases, the latter results in the strongest resultant force.

The theory described above relates to impellers with one or several vanes. Impellers with one vane (one-channel impeller) are also exposed to a rotating force.

The disadvantages caused by the above mentioned radial force are that the pump shaft must be dimensioned for the maximum radial force in order to avoid shaft damages, diminish the bearing load, secure the function of the shaft seals and diminish the wear on the seal that usually is arranged between pump housing and impeller at the pump inlet.

SUMMARY OF THE INVENTION

It is an object of the present invention to avoid the above mentioned disadvantages by forming the seal that is arranged between impeller and pump housing so that one of the seal rings is provided with two or two groups of notches along a part of the height of the ring arranged peripherally and heading the other seal ring. The notches are connected to the inner of the pump housing and the outer surroundings respectively. The pressure difference over the seal brings about a radial force on the impeller in a direction towards that part of the impeller heading the first notch or group of notches.

According to a broad aspect of the invention there is provided an apparatus for balancing radial forces in rotor dynamic machines, especially centrifugal pumps, which are provided with a pump impeller and impeller shaft mounted within a pump housing and seal means between the pump impeller and pump housing wherein, as a result of reaction forces, a resultant force influences the impeller and shaft in a certain radial direction, comprising: means for exposing said impeller to a pressure differential, which pressure differential results in a force opposing said resultant force.

The above and other objects of the present invention will be more clearly understood from the following detailed description taken in conjunction with the accompanying drawings, in which:

DESCRIPTION OF THE PREFERRED EMBODIMENT

Figure 1:
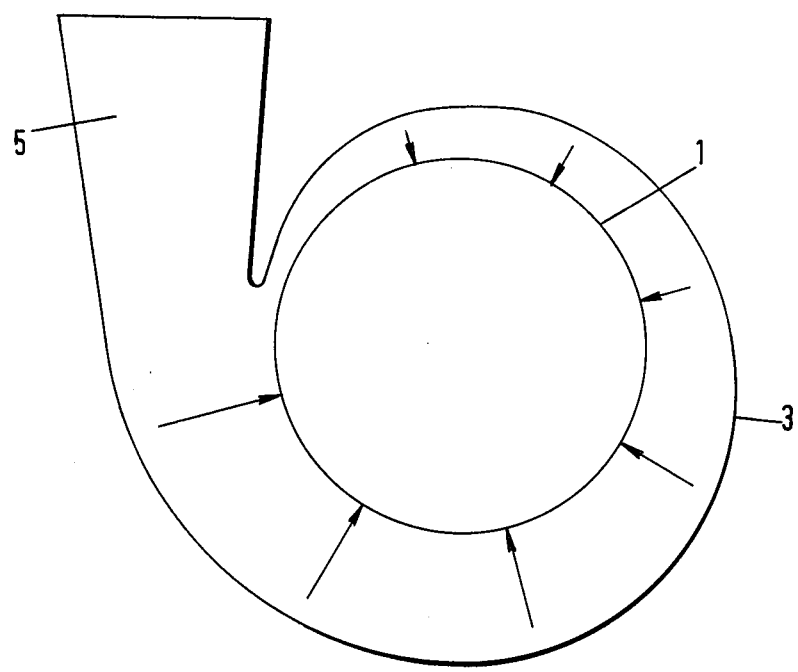
FIG. 1 shows the allocation of radial forces on a pump impeller.
Figure 2:
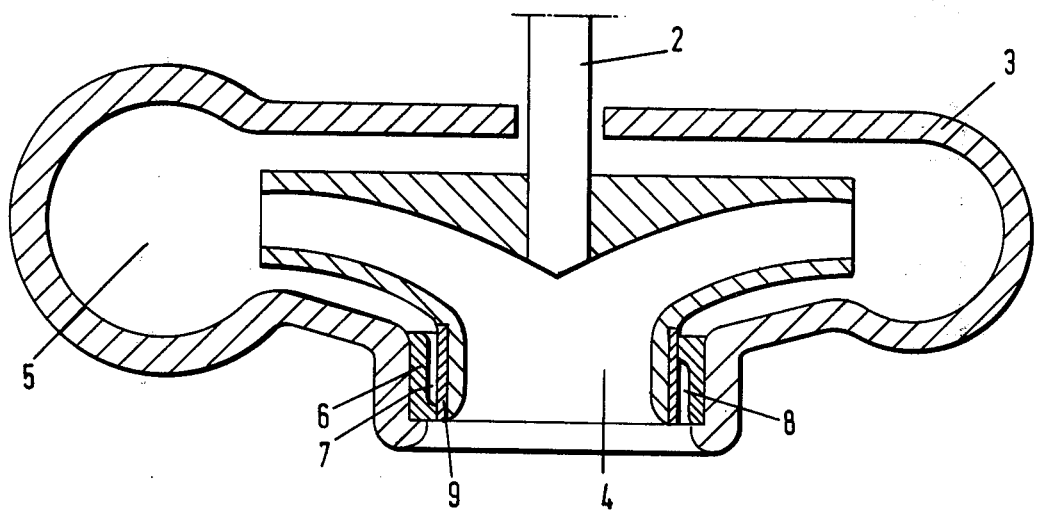
FIG. 2 shows a pump housing and an impeller in cross-section.

FIGS. 1 and 2 show an impeller with several vanes, an impeller shaft 2, a pump housing 3 surrounding the impeller having an inlet 4 and an outlet 5. A non-rotating seal ring 6 is arranged around the inlet with notches 7 and 8. A seal ring 9 is mounted on the impeller by the inlet.

Figure 4:
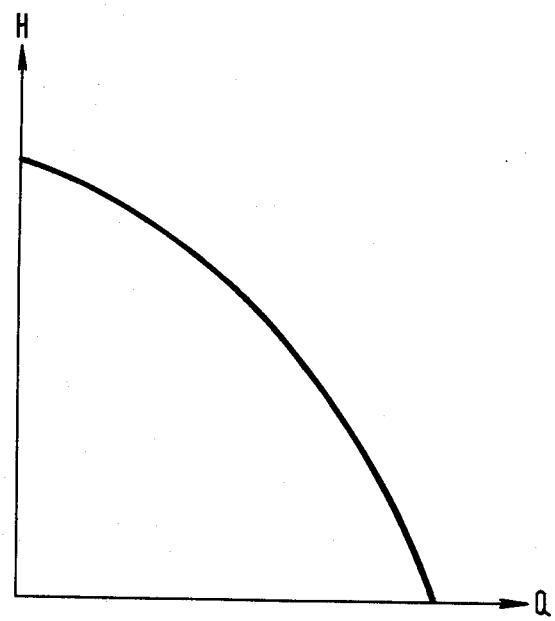
FIG. 4 shows an example of the relationship between volume flow and head for a centrifugal pump.

As was mentioned above the strongest resultant radial force $R_{max}$ occurs with maximum head $H_{max}$ (see FIG. 4). The direction of this force varies with different types of pumps, but can be determined relatively correct. In order to counteract this force a balancing force with an opposite direction is needed. This balancing force may be obtained by a special design of the seals that often are arranged between impeller and pump housing either at the inlet or at the opposite side of the impeller. The seal at the inlet prevents the pumped medium from going backwards outside the impeller while a seal at the opposite side of the impeller serves as an aid for balancing the axial forces influencing the impeller.

The seal is normally designed as a so-called throttle seal and comprises a ring 6 mounted on the pump housing 3, which ring has a cylinder formed surface facing a ring 9 mounted on the impeller. Between the rings there is a narrow gap which only lets slight medium through.

On each side of the seal different pressures prevail. On the side facing the pump housing the high pressure prevails therein, while on the other side there is the pressure of the pumped medium — often about atmospheric pressure.

Figure 3:
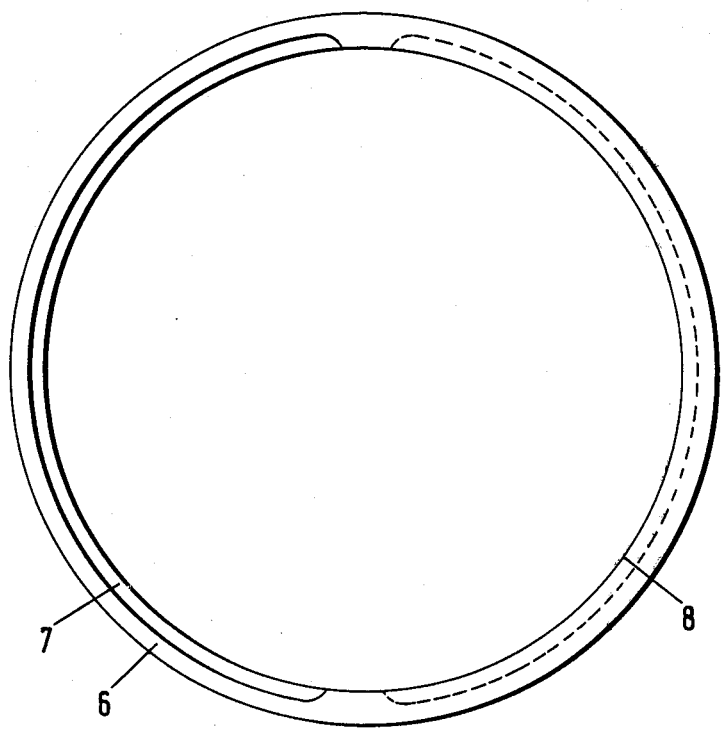
FIG. 3 shows a seal ring in the axial direction.

According to one embodiment of the invention, the outer non-rotating seal ring 6 is provided with two or more notches 7, 8 along its inner periphery (FIG. 3). One of the notches or group of notches are on the one half of the periphery of the ring and are connected to the inner of the pump housing, while the other notch or group of notches are on the other half of the periphery of the ring and are exposed to the surroundings outside the pump housing. The notches do not cover the whole height of the seal ring but leave a part of it with an unbroken seal surface which seals against the seal ring 9 on the impeller. The first notch or group of notches 7 which are connected to the inner of the pump housing 3 are then arranged on that part of the periphery which is opposite the direction from which the maximum radial force $R_{max}$ attacks. The other notch or group of notches 8 are arranged on the opposite side of the periphery. The following forces will then appear when the pump is working at head $H_{max}$ when, as previously mentioned, the resultant radial force $R_{max}$ is strongest.

From the direction $R_{max}$ attacks, the pressure of the pump housing prevails at the edge of the seal ring facing the impeller. A step further in on the seal ring to that level where the second notch or group of notches 8 reach, the inlet pressure prevails (about atmospheric pressure). On the other side of the impeller opposite the attack direction of $R_{max}$, the pressure $P_{max}$ prevails at the edge of the seal ring facing the pump housing and in to the level that the first notch or group of notches 7 reach, while atmospheric pressure prevails only at the edge of the seal ring turned away from the pump housing. $P_{max}$ will then influence that part of the impeller which is located in front of the first notch or group of notches 7 and as they are located on the periphery opposite $R_{max}$. A counterbalancing of the $R_{max}$ will take place.

The balancing force B does not necessarily have to be as big as $R_{max}$ when the seal is arranged at the pump inlet as the distance between the force B and the bearing is longer than that between $R_{max}$ and the bearing which means that B has a longer torque arm.

The conditions described above are valid at maximum head, $H_{max}$ (see FIG. 4). At maximum volume flow $Q_{max}$, the resultant R is directed in another direction and is not as big as $R_{max}$. At $Q_{max}$ however, the special design of the seal will not have any influence as the pressures on each side of the seal are about the same.

When the pump is provided with an impeller with only one outlet (one channel impeller) another radial force also occurs, which force has no fixed direction but rotates. With such pumps it is possible to design the rotating seal ring in the above described way, which means that the balancing force also rotates.

Figure 5:
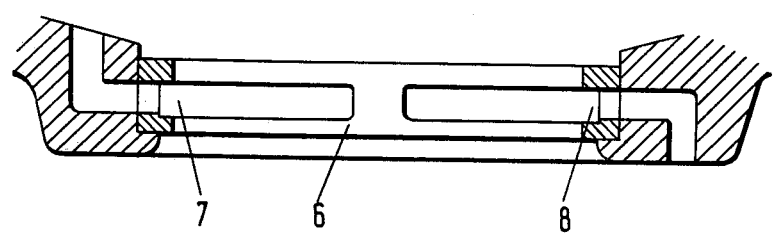
FIG. 5 shows another embodiment of a seal ring according to the invention.

According to the embodiment shown in FIG. 5, the notches 7 and 8 are so arranged that an unbroken seal surface remains on both sides of the notches while these are connected to the inner of the pump housing through channels.

In the above described way the problems with shaft bendings caused by radial forces on impeller and pump housing resulting in risks of abnormal shaft loads, seal defects, bearing damages and such things are solved in a simple and effective way. In the description centrifugal pumps have been referred to but in other types of rotor dynamic machines such as turbines and fans, where similar problems occur, it is possible to use the invention for balancing radial forces.

What is claimed is:

1. An apparatus for balancing radial forces in rotor dynamic machines, especially centrifugal pumps, which are provided with a pump impeller having an annular axial wall portion provided with a suction eye and impeller shaft mounted within a pump housing and seal means between the pump impeller annular axial wall portion and pump housing wherein, as a result of reaction forces of fluid flow through said pump housing a resultant force influences the impeller and shaft in a certain radial direction, comprising:

means for exposing said impeller to a pressure differential, which pressure differential results in a force opposing said resultant force, said means including seal means coupled between said impeller and said pump housing, said seal means having at least two circumferential notches therein, one of which extends along one-half of the periphery of said seal means and exposed to the inner pressure of the pump housing, and the other of which extends along the other half of said seal means and exposed to a pressure external of said pump housing.

2. A device according to claim 1 wherein said seal means comprises:

a first seal ring surrounding and engaging the periphery of said impeller; and a second seal ring coupled to the inner periphery of said pump housing, said second seal ring having therein at least two notches along a portion of the ring height, said at least two notches arranged peripherally along opposite halves of said second seal ring and facing said first seal ring wherein at least one of the notches is exposed to the inner pressure of the pump housing and the other of said notches is exposed to a pressure external of said pump housing such that a pressure differential is produced resulting in a radial force on the impeller in a direction towards that part of the impeller facing the first notch.

3. A device according to claim 2 wherein said second seal ring is a non-rotating seal ring, thereby producing a balancing force in a constant direction.

4. A device according to claim 3 wherein said first seal ring is a rotating seal ring and said at least two notches are formed therein.

5. An apparatus according to claim 1 wherein said seal means is exposed to said interior and exterior pressures by channels in said pump housing.

* * * * *